(12) United States Patent
Mertz et al.

(10) Patent No.: US 8,843,163 B2
(45) Date of Patent: Sep. 23, 2014

(54) WIRELESS PRIORITY SERVICE WITHIN A DISTRIBUTED CALL PROCESSING ARCHITECTURE

(75) Inventors: Michael Mertz, McKinney, TX (US); Gary Stephens, Richardson, TX (US); Mahmud Alam, Ottawa (CA); Mark Hebert, Whitewright, TX (US); Robert Swanson, Allen, TX (US); Roy Smith, Forney, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 975 days.

(21) Appl. No.: 12/951,240

(22) Filed: Nov. 22, 2010

(65) Prior Publication Data

US 2012/0033801 A1 Feb. 9, 2012

Related U.S. Application Data

(60) Provisional application No. 61/371,918, filed on Aug. 9, 2010.

(51) Int. Cl.
| | |
|---|---|
| *H04W 4/00* | (2009.01) |
| *H04W 4/22* | (2009.01) |
| *H04W 28/08* | (2009.01) |
| *H04W 76/00* | (2009.01) |
| *H04W 72/10* | (2009.01) |
| *H04W 28/16* | (2009.01) |
| *H04W 72/04* | (2009.01) |

(52) U.S. Cl.
CPC .............. *H04W 28/08* (2013.01); *H04W 72/10* (2013.01); *H04W 4/22* (2013.01); *H04W 28/16* (2013.01); *H04W 76/007* (2013.01); *H04M 2242/04* (2013.01); *H04W 72/0426* (2013.01)

USPC ........... 455/461; 455/445; 455/466; 370/331; 379/221.14

(58) Field of Classification Search
USPC .......... 455/445, 461, 560, 466; 370/331, 522; 379/221.14, 142.01, 265.11, 201.03, 379/52, 211.01, 244, 242, 219
See application file for complete search history.

(56) References Cited

U.S. PATENT DOCUMENTS

| | | | | |
|---|---|---|---|---|
| 7,689,426 | B2 * | 3/2010 | Matula ....................... | 704/270.1 |
| 8,488,960 | B2 * | 7/2013 | Decusatis et al. ............... | 398/25 |
| 2003/0128818 | A1 * | 7/2003 | Kerr et al. ...................... | 379/67.1 |
| 2004/0136520 | A1 * | 7/2004 | Ehreth et al. ............. | 379/399.01 |
| 2008/0096588 | A1 * | 4/2008 | Waytena et al. .............. | 455/466 |
| 2011/0317820 | A1 * | 12/2011 | Torgersrud et al. ........ | 379/88.09 |

* cited by examiner

*Primary Examiner* — Mahendra Patel

(57) ABSTRACT

A system, method, and call processing component for controlling an order of call processing among a plurality of call processing components. Each call processing component, upon receiving a call request when system resources are not available to process the requested call, creates a real queue entry in its call processing queue and sends a call-queued notification to all other call processing components in the system. The other call processing components in the telecommunication system then create a shadow queue entry in their respective call processing queues as a placeholder for the requested call. When system resources become available and the requested call is next in the queue, the call processing component that received the request de-queues and processes the requested call, and sends a call de-queued notification to the other call processing components. In response, each of the other call processing components removes the placeholder queue entry for the requested call from each call processing component's call processing queue.

24 Claims, 6 Drawing Sheets

WIRELESS PRIORITY SERVICE WITHIN A DISTRIBUTED CALL PROCESSING ARCHITECTURE

CROSS-REFERENCE TO RELATED APPLICATIONS

This application claims the benefit of U.S. Provisional Application No. 61/371,918 filed Aug. 9, 2010, the disclosure of which is incorporated by reference herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to radio telecommunication systems. More particularly, and not by way of limitation, the present invention is directed to a system and method for controlling an order of call processing among a plurality of call processing components.

The U.S. Government has developed the Government Emergency Telecommunications Services (GETS), where during national, state, or local emergencies, designated mobile terminals are given priority within the wireless network. A feature referred to as the Wireless Priority Services (WPS) feature gives Network Security and Emergency Preparedness (NSEP) calls a higher probability of completion during periods of high call blockage.

The WPS feature provides the software infrastructure to manage the assignment of call resources between public calls and WPS calls, or between WPS calls with different priorities. The WPS calls are guaranteed a specified (configurable) amount of call resources within the wireless network. The public and WPS calls take turns in requesting these call resources. The party whose turn it is has priority for the call resources that are available. If no resources are available, the party whose turn it is has priority when the resources become available. WPS calls with the highest priority are serviced first. If they are of equal priority, the WPS calls are serviced in the order they are placed. Therefore, a WPS call should never receive call resources before WPS calls of equal priority placed ahead of it.

The Public User Reservation Departure Allocation Algorithm (PURDA) is an algorithm that distributes call resources between public calls and WPS calls. It takes advantage of the fact that WPS users typically need only a small amount of call resources. Two important parameters for the PURDA algorithm are SuperCount and PURDA_N_RATIO. The SuperCount is the number of WPS users that are initially allowed priority over public users. In other words, the SuperCount is the number of WPS calls that get access to the call resources before any public calls are allowed. An Initial Usage Counter (IUC) keeps track of initially served WPS calls.

A configurable value, N, is defined on a per cell-sector basis and is used to track the number of call resources that are provided to both public and WPS calls. WPS call attempts receive priority for new call resources that are available, 1 out of every N calls. Public calls receive priority for new call resources N−1 out of every N calls. The value for N is provisioned via the configuration parameter PURDA_N_RATIO. A local "n" counter keeps track of WPS and public call turns.

The PURDA algorithm allows:
N−1 call resources to go to public calls (per cell-sector); and
The Nth resource to go to WPS calls (per cell-sector).

If PURDA is active, the IUC and n counters are updated for:
a WPS call origination or termination;
a Public call origination or termination;
a Retry for WPS originating or terminating leg; and
a Retry Failure for WPS originating or terminating leg.

The current WPS feature and PURDA algorithm are used/implemented within a single call processing system where all of the call resources are owned and managed by a single entity. In order to continually improve and increase the call capacity, the telecommunications industry is quickly evolving to a distributed call processing system. In a distributed call processing system, resources are "distributed" across multiple call processing nodes. Each call processing node owns and manages its assigned slice of the system resources, but does not have a view of the resources of other nodes. There are also common system resources managed by central entities that the call processing nodes must request.

In a first example scenario, Mobile A makes a public call request at call processing node 1, and Mobile B makes an NSEP call request at call processing node 2. If PURDA determines that it is a public turn, then Mobile A has priority over Mobile B for the resources currently available or if not available, when they become available within the system. If PURDA determines that it is a NSEP turn, then Mobile B has priority over Mobile A for the resources currently available or if not available, when they become available within the system.

In a second example scenario, Mobile A makes an NSEP call request at call processing node 1 and then Mobile B makes an NSEP call request at call processing node 2. If PURDA determines that it is a NSEP turn, then mobile A has priority over the resources currently available or if not available, when they become available within the system.

BRIEF SUMMARY OF THE INVENTION

The WPS requirements set forth by GETS applies to the entire telecommunications system where the WPS feature resides. In other words, an NSEP call must still be given the opportunity to acquire, at the appropriate time, resources available across the system regardless of the call processing node handling the call request. Also, the PURDA algorithm has to derive the same answer across all call processing nodes within the system whether it is a public turn or NSEP turn.

Under the current solution, however, each call processing node in a distributed call processing system makes independent local decisions regarding whose turn it is and what resources are available. Thus, under the current solution, the requirements set forth by GETS are not met. As in the above-described scenarios, the wrong mobile could get priority over the available resources, thus blocking an NSEP caller or the correct NSEP caller, or blocking public calls when they should not be.

Therefore, it would be advantageous to have a system and method for allocating system resources to identified mobile terminals on a priority basis utilizing resources available across the entire system regardless of the call processing node handling the call request. The present invention provides such a system and method.

In one embodiment, the present invention is directed to a computer-controlled method in a telecommunication system for controlling an order of call processing among a plurality of call processing components. The method includes the steps of receiving a call request at a first call processing component; determining by the first call processing component that system resources are not currently available to process the requested call; queuing the requested call in the first call processing component's call processing queue; and sharing queue information with all other call processing components in the telecommunication system. In response to receiving the queue information, each of the other call processing components in the telecommunication system creates a placeholder queue entry for the requested call in each call processing component's call processing queue. The method also includes subsequently de-queuing and processing the requested call by the first call processing component when system resources become available and the requested call is the next call in the first call processing component's call processing queue to be processed; and sending a notification to the other call processing components in the telecommunication system indicating that the requested call has been de-queued and processed. In response to receiving the notification, each of the other call processing components removes the placeholder queue entry for the requested call from each call processing component's call processing queue.

In another embodiment, the present invention is directed to a first call processing component in a telecommunication system for controlling an order of call processing among a plurality of call processing components. The first call processing component includes means for receiving a call request; means for determining that system resources are not currently available to process the requested call; and a call processing queue for storing a real queue entry for the requested call. The first call processing component also includes means for sending a call-queued notification to all other call processing components in the telecommunication system, the call-queued notification causing each of the other call processing components in the telecommunication system to create a placeholder queue entry for the requested call in each call processing component's call processing queue; means for subsequently de-queuing and processing the requested call when system resources become available and the requested call is the next call in the first call processing component's call processing queue to be processed; and means for sending a call de-queued notification to the other call processing components in the telecommunication system indicating that the requested call has been de-queued and processed, the call de-queued notification causing each of the other call processing components to remove the placeholder queue entry for the requested call from each call processing component's call processing queue.

In another embodiment, the present invention is directed to a call processing system for controlling an order of call processing among a plurality of call processing components. The call processing system includes a first call processing component; and a plurality of other call processing components. The first call processing component includes means for receiving a call request; means for determining that system resources are not currently available to process the requested call; a call processing queue for storing a real queue entry for the requested call; means for sending a call-queued notification to the plurality of other call processing components in the telecommunication system; means for subsequently de-queuing and processing the requested call when system resources become available and the requested call is the next call in the first call processing component's call processing queue to be processed; and means for sending a call de-queued notification to the other call processing components in the telecommunication system indicating that the requested call has been de-queued and processed. Each of the plurality of other call processing components includes means for receiving the call-queued notification and the call de-queued notification from the first call processing component; means, responsive to receiving the call-queued notification, for creating a placeholder queue entry for the requested call in each call processing component's call processing queue, wherein the placeholder queue entry serves as a placeholder for the requested call but does not cause the other call processing component to process the requested call; and means, responsive to receiving the call de-queued notification, for removing the placeholder queue entry for the requested call from the other call processing component's call processing queue.

In another embodiment, the present invention is directed to a computer-controlled method in a telecommunication system for controlling an order of call processing among a plurality of call processing components. The method includes the steps of receiving a call request at a first call processing component; determining by the first call processing component that system resources are not currently available to process the requested call; creating by the first call processing component, a real queue entry for the requested call in the first call processing component's call processing queue; and sending from the first call processing component to all other call processing components in the telecommunication system, a call-queued notification indicating that the requested call has been queued while awaiting system resources to process the call. The method also includes creating by each of the other call processing components in the telecommunication system in response to receiving the call-queued notification, a shadow queue entry for the requested call in each of the call processing component's call processing queue, wherein the shadow queue entry serves as a placeholder for the requested call but does not cause any of the other call processing components to process the requested call. The method also includes subsequently determining by the first call processing component that system resources have become available to process the requested call and that the requested call is the next call in the first call processing component's call processing queue to be processed; de-queuing and processing the requested call by the first call processing component; sending from the first call processing component to all other call processing components in the telecommunication system, a call de-queued notification indicating that the requested call has been de-queued and processed; and in response to receiving the call de-queued notification, removing by each of the other call processing components in the telecommunication system, the shadow queue entry for the requested call from each call processing component's call processing queue.

Thus, the present invention meets the GETS requirements for WPS calls within a distributed call processing architecture where multiple call process entities exist within the system or pool. The invention guarantees the NSEP caller a percentage of the system resources. Thus, in a national, state, or local emergency or other period of high call blockage, key individuals are able to communicate with each other.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1A:
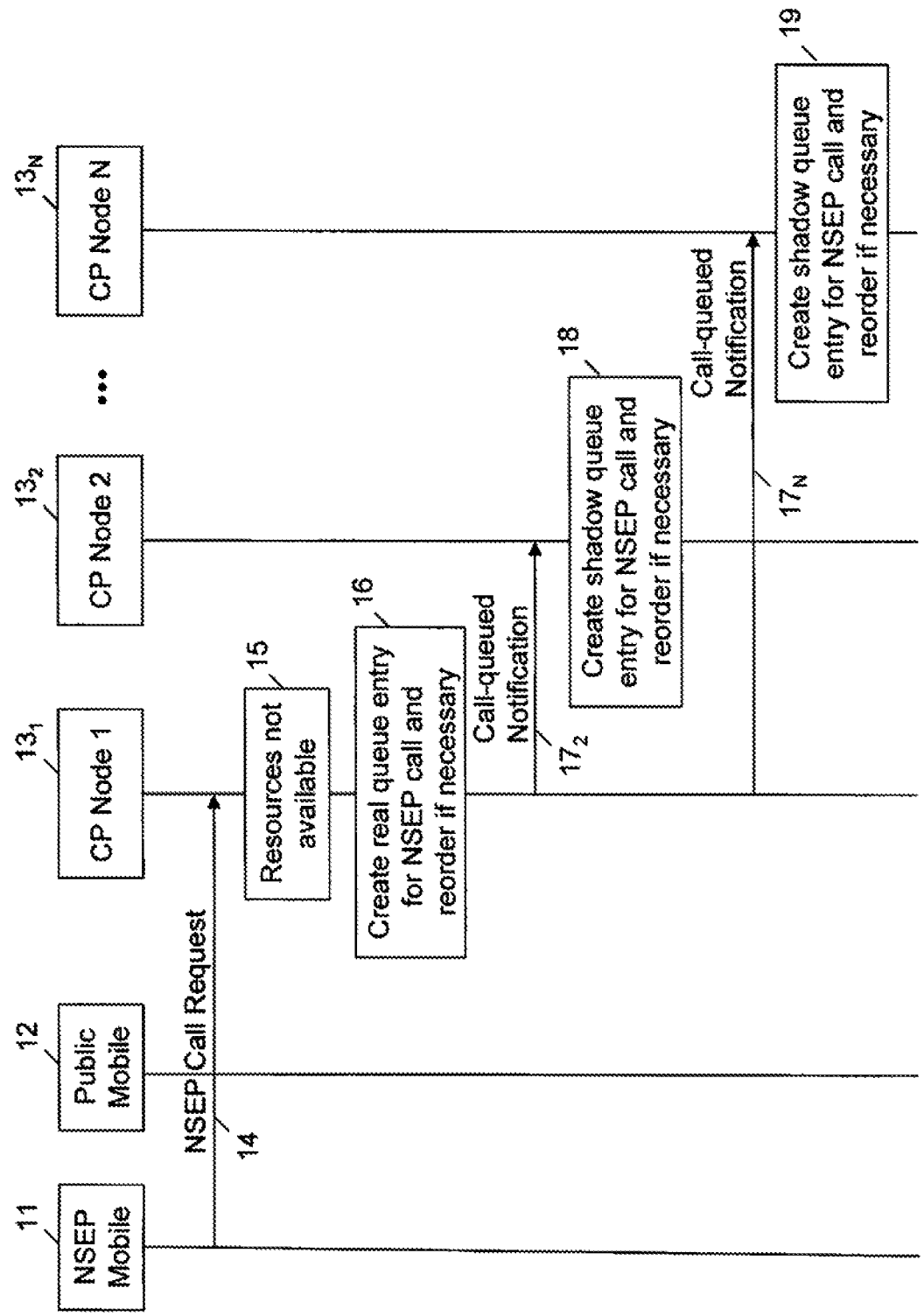
FIGS. 1A-1D are portions of a message flow diagram showing the flow of messages between call processing nodes in an exemplary embodiment of a method of performing PURDA synchronization.

In order to properly guarantee that the correct mobile call is given the available resources within the system, each call processing node must have the same view and be making the same decisions based on the same information. Thus, each call processing node needs to know whose turn it is within the system. The PURDA algorithm at each call processing node has to derive the same answer as to whose turn it is, public or WPS, to request available resources within the system. For example, call processing node 1 and call processing node 2 both have to know that it is a public turn or WPS turn. In order to do that, the PURDA algorithm at each call processing node has to have the same input data. Additionally, in order to ensure that NSEP callers are given the correct priority between each other, or for the NSEP call to wait appropriately for its turn, each call processing node needs to have the same view of the WPS priority queues.

Call requests from mobile stations may be added to the access queue whenever "access" resources are not available. Access resources are those required for providing connectivity from the mobile station to core network switching nodes such as a Mobile Switching Center (MSC) or Serving GPRS Service Node (SGSN). Such resources include, but are not limited to RF power, Walsh codes, channel elements, MSC-to-BSC bearer transport, and the like. Thus, the access queue is a queue for any of these resources.

For access queue handing, PURDA counters are synchronized across the call processing nodes. WPS access queue entries are shadowed across the call processing nodes in order to maintain a holistic system view. Call resources are requested normally, and if available, are given to the turn identified by the PURDA algorithm. If the requested call is a public call and call resources are not available, then the call may be queued or may be discarded. If this is a NSEP call and call resources are not available, then the call is placed back into the WPS access queue. In this way, only one NSEP call will be handled at a time within the entire distributed system, regardless of which call processing node is handling the call.

It should be noted that queuing public calls when resources are not available is optional. NSEP calls are queued when resources are not available, but whether or not the public calls are queued is dependent on the vendor. Some vendors do not queue public calls because during overload, additional public calls show up quickly, so there is always a call ready to be serviced. Thus, there is not much value in queuing the public calls; it only shifts which public call gets the resources, but does not significantly increase throughput of the public calls.

FIGS. 1A-1D are portions of a message flow diagram showing the flow of messages between call processing nodes in an exemplary embodiment of a method of performing PURDA synchronization. The present invention synchronizes PURDA algorithm-specific data across all call processing nodes and synchronizes the WPS access queues across all call processing nodes. For PURDA synchronization, whenever there is any change in PURDA data such as, for example, counters, call types, resource status, and the like, then these changes are sent to all the other call processing entities in the system or pool. In this way, all call processing nodes utilize the same information to determine such attributes as whether it is a "public" or "WPS" turn, whether the SuperCount has been exhausted, and the state of the IUC counter.

As the local "n" counter keeps track of WPS and Public call turns, the SuperCount is adjusted to account for WPS and Public calls that are processed. For example, a number of WPS calls may be processed, using half of the SuperCount. If there are no more WPS calls, the SuperCount is restored as Public calls are processed. While it is known to use this process in a single call processing entity, the present invention extends this functionality and coordinates local "n" counters and the SuperCount across multiple call processing entities.

PURDA synchronization creates the same WPS queue entries at each call processing node. In this way, each node has the same view of which WPS calls have to be serviced and their related priorities. This ensures that a WPS call on call processing node 1 that has been requested before a WPS call of equal priority on call processing node 2 is serviced first when system call resources become available, or that a WPS call on call processing node 1 that has a higher priority over a WPS call on call processing node 2 is serviced first when system call resources become available. PURDA also ensures that Public calls receive system call resources when counters indicate it is the public's turn.

When PURDA is active and resources are not immediately available to service a WPS call request, the WPS call is placed into a queue based on a cell-sector identification. Once a "real" entry for the WPS call is created in the queue, the queuing node sends a WPS Call-queued notification to all other call processing entities within the system notifying them of the queue entry. Each call processing entity that receives the WPS Call-queued notification creates a "shadow" entry for this WPS call within its local queue. The shadow queue entry serves as a placeholder for the requested call but does not cause any of the other call processing entities to process the requested call. Once call resources become available, the queuing node with the real entry de-queues and processes the WPS call. The queuing node then sends a WPS Call de-queued notification to all other call processing entities within the system notifying them of the de-queuing event. Each call processing entity that receives the WPS Call de-queued notification removes the shadow entry for this WPS call within its local queue. In this way, WPS queue information is synchronized across all call processing entities within the system.

WPS calls can also be removed from the queue if it takes too long to find system call resources. The length of this timeout period is programmable. For example, if a timeout timer is set at 60 seconds and resources are not found for a particular WPS call within 60 seconds, the WPS call is de-queued, failure is recorded, and the Call Processing (CP) node handling the WPS call sends a message to the other nodes to remove their shadow entries.

Likewise, if a WPS caller abandons the call before resources become available, the CP node handling the WPS call de-queues the call and sends a message to the other nodes to remove their shadow entries.

When a WPS call is queued and a higher priority WPS call comes in, the CP node that receives the higher priority WPS call creates a real queue entry in front of the existing queue entry, which may be a real or shadow entry. The CP node sends a message indicating the priority of the newly received call to the other nodes to create shadow entries for the higher priority WPS call. If the queue is full, each of the CP nodes removes the oldest, lowest priority WPS call from the queue to make room for the new entry.

Referring to FIG. 1A, an NSEP mobile terminal 11, a Public mobile terminal 12, and Call Processing (CP) Nodes 1 through N 13$_1$-13$_N$ are depicted. The NSEP mobile terminal sends an NSEP Call Request 14 to CP Node 1, which determines at 15 that resources are not available for the call. At 16, CP Node 1 creates a real queue entry for the NSEP call in CP Node 1's call processing queue. The order of NSEP calls in the queue may be reordered so that NSEP calls of higher priority are processed first. NSEP calls of equal priority are queued first-come, first-served. The CP Node 1 then sends a WPS Call-queued notification to all other CP nodes in the system. This is illustrated by Call-queued notification 17$_2$ to CP Node 2 and Call-queued notification 17$_N$ to CP Node N. At 18, the CP Node 2 creates a shadow queue entry for the NSEP call in CP Node 2's call processing queue and reorders the entries to account for differing priorities, if necessary. At 19, CP Node N creates a shadow queue entry for the NSEP call in CP Node N's call processing queue and reorders the entries to account for differing priorities, if necessary. The method then moves to FIG. 1B.

Figure 1B:
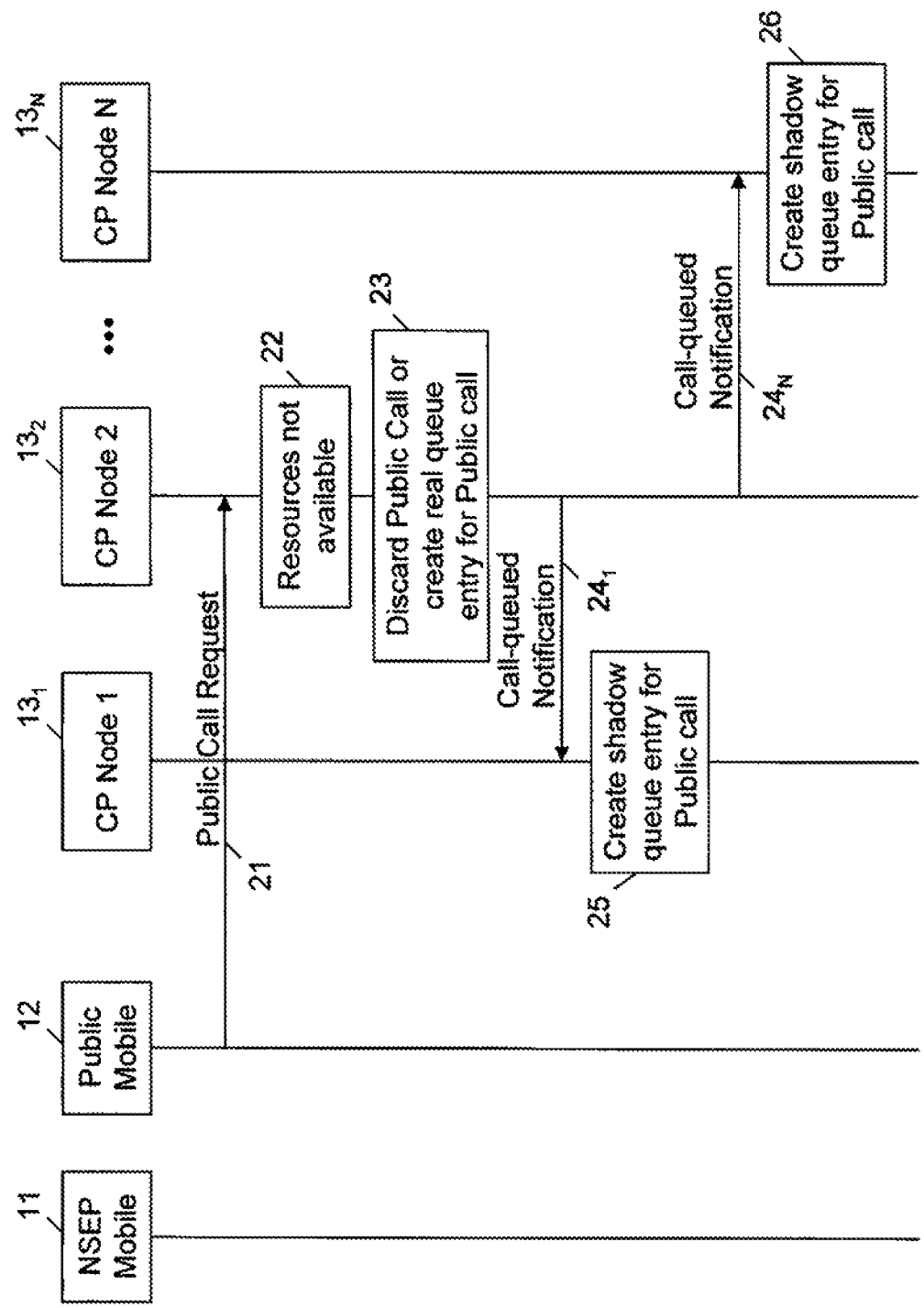

Referring now to FIG. 1B, the Public mobile terminal 12 sends a Public Call Request 21 to CP Node 2 13$_2$, which determines at 22 that resources are not available for the call. At 23, CP Node 2 either discards the Public call or creates a real queue entry for the Public call in CP Node 2's call processing queue. If a queue entry is made, the CP Node 2 then sends a WPS Call-queued notification to all other CP nodes in the system. This is illustrated by Call-queued notification 24$_1$ to CP Node 1 and Call-queued notification 24$_N$ to CP Node N. At 25, the CP Node 1 creates a shadow queue entry for the Public call in CP Node 1's call processing queue. At 26, CP Node N creates a shadow queue entry for the Public call in CP Node N's call processing queue. The method then moves to FIG. 10.

Referring now to FIG. 10, CP Node 1 13$_1$ determines at some later time indicated by block 31 that resources are available for the NSEP call and that the NSEP call is the next call in CP Node 1's call processing queue to be processed. At 32, the CP Node 1 de-queues and processes the NSEP call. The CP Node 1 then sends a WPS Call de-queued notification to all other CP nodes in the system. This is illustrated by Call de-queued notification 33$_2$ to CP Node 2 and Call de-queued notification 33$_N$ to CP Node N. At 34, the CP Node 2 removes the shadow queue entry for the NSEP call from CP Node 2's call processing queue. At 35, CP Node N removes the shadow queue entry for the NSEP call from CP Node N's call processing queue. The method then moves to FIG. 1D.

Figure 1C:
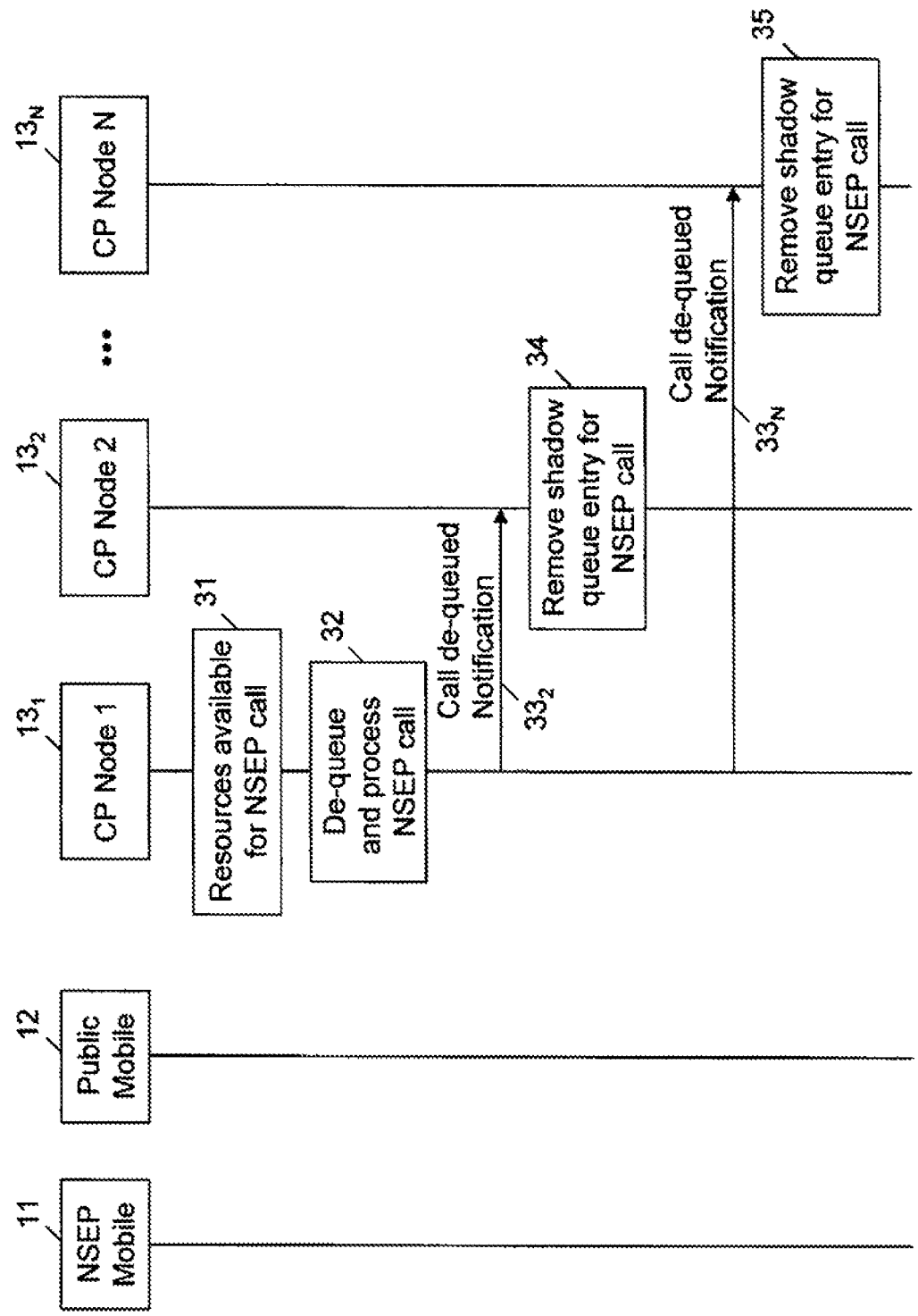
Figure 1D:
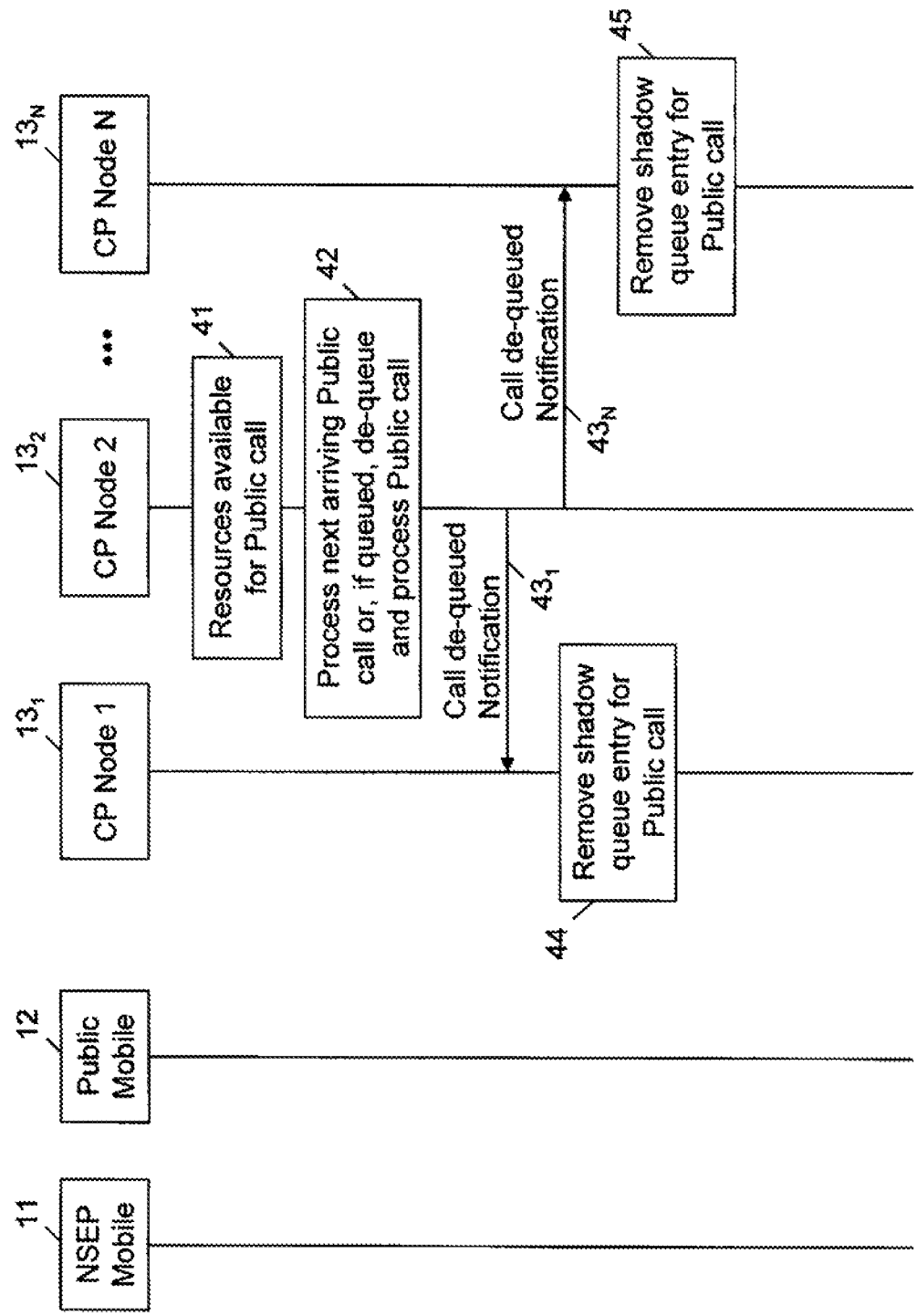

Referring now to FIG. 1D, CP Node 2 13$_2$ determines at some later time indicated by block 41 that resources are available for the Public call. At 42, if Public calls are not being queued, the CP Node 2 may process the next arriving Public call. If Public calls are being queued and the Public call is the next call in CP Node 2's call processing queue to be processed, the CP Node 2 de-queues and processes the Public call. The CP Node 2 then sends a WPS Call de-queued notification to all other CP nodes in the system. This is illustrated by Call de-queued notification 43$_1$ to CP Node 1 and Call de-queued notification 43$_N$ to CP Node N. At 44, the CP Node 1 removes the shadow queue entry for the Public call from CP Node 1's call processing queue. At 45, CP Node N removes the shadow queue entry for the Public call from CP Node N's call processing queue.

The present invention may be implemented between call processing components at any level of a distributed call processing architecture. A call processing component may be, for example, a call processing instance on a single blade with one or more processors of a Mobile Switching Center (MSC), or may be a call processing node such as an MSC or Serving GPRS Service Node (SGSN), or may be a call processing system of multiple call processing nodes that interfaces with other call processing systems.

Figure 2:
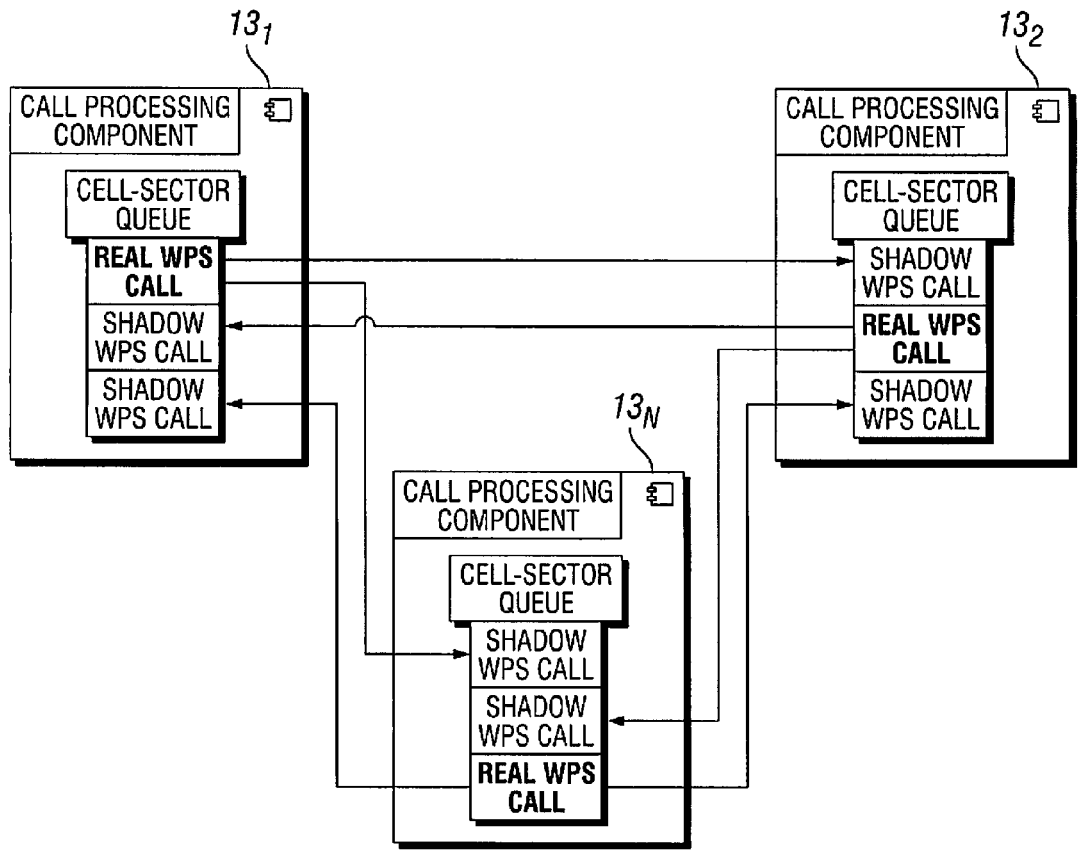
FIG. 2 is a simplified block diagram illustrating synchronization of cell-sector queues in multiple call processing nodes in a telecommunication system.

FIG. 2 is a simplified block diagram illustrating synchronization of cell-sector queues in multiple call processing components in a telecommunication system. The call processing components may be, for example, CP Nodes 1, 2, and N 13$_1$-13$_N$ of FIGS. 1A-1D. Each call processing component maintains the same view of the cell-sector queue where the order and priority of each WPS call is maintained. In this way each WPS call is serviced in the correct order as system resources become available. The shadow queue entries serve as placeholders for requested calls but do not cause any of the other call processing components to process the requested call when its turn to be processed arrives. Instead, components with a shadow entry wait for the call to be processed by the processing component with the real queue entry. Once the WPS call associated with the real entry is processed, the processing component sends a WPS de-queue notification to each call processing component in the system, where the shadow call is removed from the local queue.

There are specific error conditions that must be considered under this solution:

1. If a received WPS call needs to be placed into the WPS cell-sector queue and the queue is full, then the oldest, lowest priority WPS call in the queue must be removed. If the call being removed is a real WPS call, then the other call processing nodes are notified to remove the associated shadow WPS call. If the call being removed is a shadow call, then the associated real WPS call is request to be removed, which subsequently will remove all shadow WPS calls.

2. If the PURDA data synchronization message is lost, then the call processing entities will be out of synchronization until PURDA is deactivated, the SuperCount is exhausted, or the next PURDA synchronization message is sent. At that time, all the call processing nodes will be synchronized again.

3. If any of the PURDA data, including the SuperCount and the current "n" value, become out-of-sync, they will be corrected upon receiving the next synchronization message.

4. With multiple synchronization messages arriving at approximately the same time, at any point the PURDA can be deactivated by previous messages that have arrived. If a given synchronization message indicating deactivation is processed after PURDA has been deactivated locally, then the given message will be discarded.

5. Sometimes specific call resources within a distributed architecture are managed by a central entity instead of being locally managed by a distributed call processing entity. In this case, the distributed call processing entity requests these call resources from the central entity. If the distributed call processing entity is notified that the call resource is not available, the distributed call processing entity creates a real queue entry for the WPS call in its local WPS queue. When the resource becomes available, the central entity managing the resource may notify the distributed call processing entity and allocate the resources to the distributed call processing entity. Alternatively, the distributed call processing entity may periodically re-request the resource (either based on time or other events such as incoming disconnects and setups). This avoids the need for the central entity to inform the distributed call processing entity when the resource is available. For example, based on the number of resources in a cell and the average call hold time, the distributed call processing entity can calculate the average waiting time for a resource to become available. It may speed up the resource allocation process to re-request the resource at that time. Once the resource is allocated, the distributed call processing entity processes the queued WPS call.

When call resources are available and PURDA is not active, the system is in steady state. If resources are not available for an NSEP call request, then the WPS solution is invoked to ensure that the NSEP call is handled appropriately across the distributed architecture.

The present invention may be implemented in any distributed call processing architecture and at any level of the architecture. All of these architectures, examples of which are shown in FIGS. 3-5 below, require the use of the present invention to properly manage the GETS WPS requirements.

Figure 3:
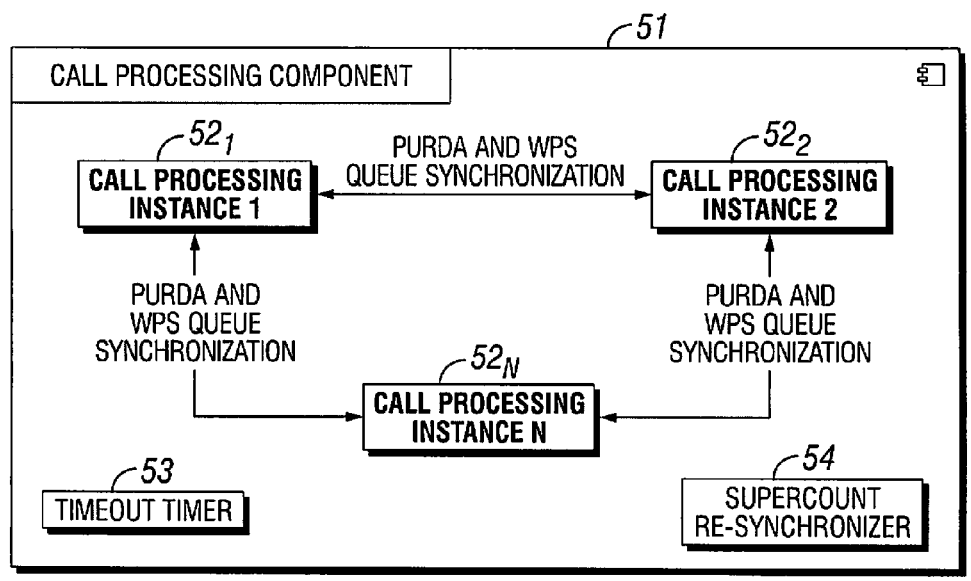
FIG. 3 is a simplified block diagram of an exemplary embodiment of the system of the present invention when implemented within a Mobile Switching Center (MSC)

FIG. 3 is a simplified block diagram of an exemplary embodiment of the system of the present invention when implemented within a call processing component 51 such as an MSC or other call processing node. In this embodiment, the hardware and software architecture is such that multiple call processing instances $52_1$, $52_2$, and $52_N$ exist on a single blade with one or more processors of the node. PURDA and WPS queue synchronization is performed between the call processing instances as illustrated in FIG. 2 above. A timeout timer 53 causes a queued WPS call to be removed from the queue if system call resources are not found within a defined time period after the WPS call is placed in the queue. A SuperCount Re-synchronizer 54 restores the SuperCount as additional Public calls are processed.

Figure 4:
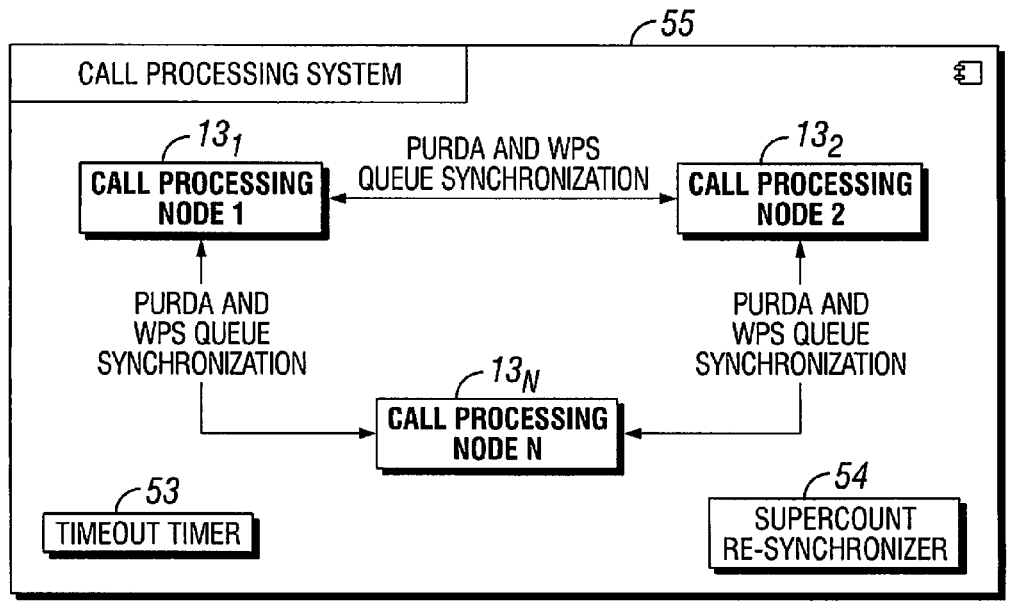
FIG. 4 is a simplified block diagram of an exemplary embodiment of the system of the present invention when implemented in multiple call processing nodes across multiple blades.
Figure 5:
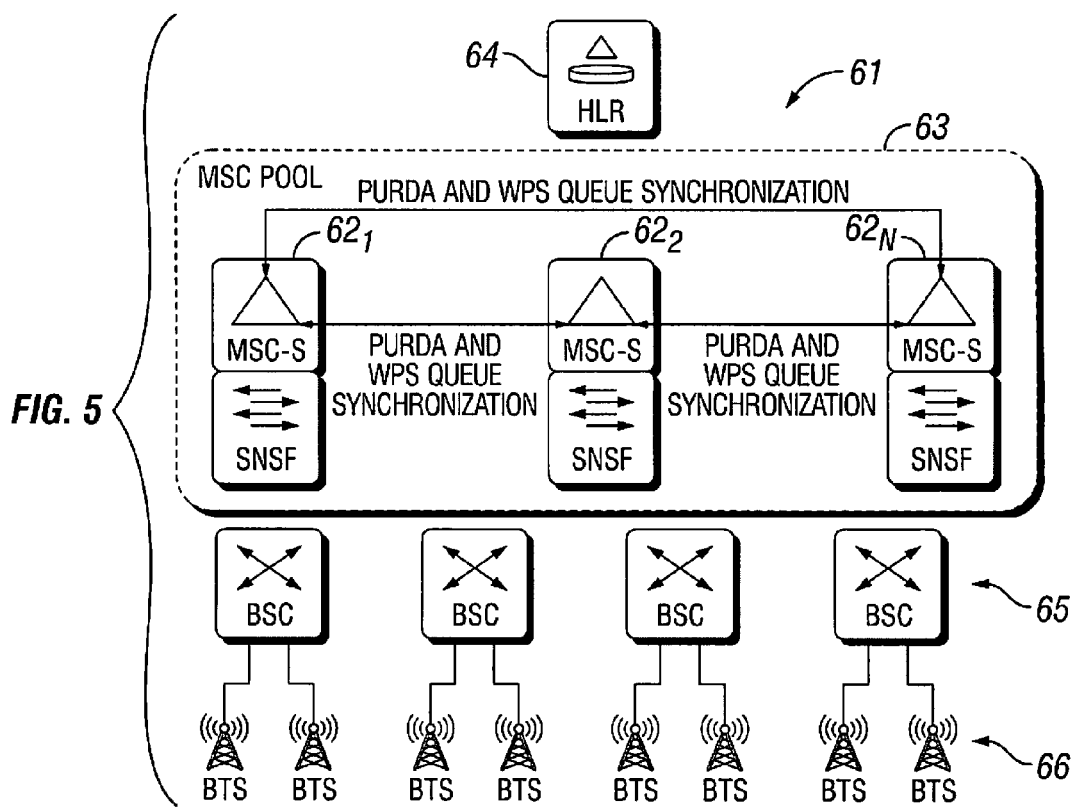
FIG. 5 is a simplified block diagram of an exemplary embodiment of the system of the present invention when implemented in an architecture for serving a larger region in which multiple call processing systems are pooled together within a pool such as an MSC Pool.

FIG. 4 alternatively shows a simplified block diagram of an exemplary embodiment of the system of the present invention when implemented as a call processing system 55 comprising multiple call processing nodes $13_1$-$13_N$ across multiple blades. PURDA and WPS queue synchronization is performed between the call processing nodes as illustrated in FIG. 2 above. This embodiment reflects the embodiment shown in FIGS. 1A-1D. Again, the timeout timer 53 causes a queued WPS call to be removed from the queue if system call resources are not found within a defined time period after the WPS call is placed in the queue. The SuperCount Re-synchronizer 54 restores the SuperCount as additional Public calls are processed.

It should be noted that in different embodiments, the present invention may be implemented to cover single or multiple blades in a single geographic location, or single or multiple blades in multiple geographic locations, with each blade having single or multiple processors.

FIG. 5 is a simplified block diagram of an exemplary embodiment of the system of the present invention when implemented in a network architecture 61 for serving a larger region in which multiple call processing systems $62_1$, $62_2$, and $62_N$ are pooled together within a pool such as an MSC Pool 63. Each call processing system is shown to include an MSC Server (MSC-S) and a Serving Node Selection Function (SNSF). The MSC Pool, of course, communicates with a Home Location Register (HLR) 64, and a plurality of Base Station Controllers (BSCs) 65, which in turn control a plurality of Base Transceiver Stations (BTSs) 66. PURDA and WPS queue synchronization is performed between the MSC-Ss as illustrated in FIG. 2 above.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A computer-controlled method in a telecommunication system for controlling an order of call processing among a plurality of call processing components, the method comprising the steps of:
    receiving a call request at a first call processing component;
    determining by the first call processing component that system resources are not currently available to process the requested call;
    queuing the requested call in the first call processing component's call processing queue;
    sharing queue information with all other call processing components in the telecommunication system, wherein each call processing component includes a call processing queue that is synchronized with the call processing queues of all other call processing components in the telecommunication system;
    in response to receiving the queue information, creating by each of the other call processing components in the telecommunication system, a placeholder queue entry for the requested call in each call processing component's call processing queue, wherein the placeholder queue entry is placed in each component's call processing queue at a position that is synchronized with the queued requested call in the first call processing component's call processing queue, and the placeholder queue entry prevents any of the other call processing components from queuing another call at the same time the requested call is queued;
    subsequently de-queuing and processing the requested call by the first call processing component when system resources become available and the requested call is the next call in the first call processing component's call processing queue to be processed;
    sending a notification to the other call processing components in the telecommunication system indicating that the requested call has been de-queued and processed; and
    in response to receiving the notification, removing by each of the other call processing components, the placeholder queue entry for the requested call from each call processing component's call processing queue.

2. The method according to claim 1, wherein the step of queuing the requested call in the first call processing component's call processing queue includes creating by the first call processing component, a real queue entry for the requested call in the first call processing component's call processing queue, the real queue entry indicating that the first call processing component is to process the requested call when system resources become available to process the requested call and the requested call is the next call in the first call processing component's call processing queue to be processed.

3. The method according to claim 2, wherein the step of creating a placeholder queue entry by each of the other call processing components includes creating a shadow queue entry that serves as a placeholder for the requested call but does not cause any of the other call processing components to process the requested call.

4. The method according to claim 1, wherein the requested call has an assigned priority, and the method further comprises the steps of:
receiving by any one of the call processing components, a second call request for a second requested call having a higher assigned priority than the first requested call;
queuing the second requested call ahead of the first requested call in the receiving call processing component's call processing queue;
sending a notification from the receiving call processing component to the other call processing components in the telecommunication system indicating that the second requested call has been queued and indicating the priority of the second requested call; and
creating by each of the other call processing components in the telecommunication system, a placeholder queue entry for the second requested call ahead of the entry for the first requested call in each call processing component's call processing queue.

5. The method according to claim 4, further comprising the steps of:
determining by the receiving call processing component that the receiving call processing component's call processing queue is full when the second call request is received;
removing from the receiving call processing component's call processing queue, an entry for an oldest, lowest priority call in the queue;
sending a notification to the other call processing components in the telecommunication system indicating that the oldest, lowest priority call in the queue has been removed; and
removing by each of the other call processing components in the telecommunication system, the corresponding queue entry for the oldest, lowest priority call in the queue.

6. The method according to claim 1, further comprising the steps of:
starting a timeout timer upon queuing the requested call in the first call processing component's call processing queue;
determining at a later time that the timeout timer has expired before system resources are available;
de-queuing the requested call in response to the timer expiring;
sending a notification to the other call processing components in the telecommunication system indicating that the requested call has been removed from the queue; and
removing by each of the other call processing components in the telecommunication system, the corresponding queue entry for the requested call.

7. The method according to claim 1, further comprising the steps of:
after queuing the requested call in the first call processing component's call processing queue, determining that the requested call has been abandoned by the call's originating party;
de-queuing the requested call in response to determining that the requested call has been abandoned;
sending a notification to the other call processing components in the telecommunication system indicating that the requested call has been removed from the queue; and
removing by each of the other call processing components in the telecommunication system, the corresponding queue entry for the requested call.

8. The method according to claim 1, wherein the requested call is a Wireless Priority Services (WPS) call, and the method further comprises the steps of:
updating an n counter and a SuperCount to keep track of whether the next call to be processed should be a public call or the WPS call; and
sending the updated n counter and SuperCount to the other call processing components in the telecommunication system.

9. A first call processing component in a telecommunication system for controlling an order of call processing among a plurality of call processing components, the first call processing component comprising:
means for receiving a call request;
means for determining that system resources are not currently available to process the requested call;
a call processing queue for storing a real queue entry for the requested call;
means for sending a call-queued notification to all other call processing components in the telecommunication system, the call-queued notification causing each of the other call processing components in the telecommunication system to create a placeholder queue entry for the requested call in each call processing component's call processing queue, wherein the placeholder queue entry is placed in each component's call processing queue at a position that is synchronized with the real queue entry for the requested call in the first call processing component's call processing queue, and the placeholder queue entry prevents any of the other call processing components from queuing another call at the same time the requested call is queued;
means for receiving a second call-queued notification from one of the other call processing components in the telecommunication system indicating an identified call has been queued in the other call processing component;
means, responsive to the second call-queued notification, for creating a placeholder queue entry for the identified call in the first call processing component's call processing queue;
means for subsequently de-queuing and processing the requested call when system resources become available and the requested call is the next call in the first call processing component's call processing queue to be processed; and
means for sending a call de-queued notification to the other call processing components in the telecommunication system indicating that the requested call has been de-queued and processed, the call de-queued notification causing each of the other call processing components to remove the placeholder queue entry for the requested call from each call processing component's call processing queue.

10. The call processing component according to claim 9, wherein the placeholder queue entry serves as a placeholder for the requested call but does not cause the first call processing component to process the requested call.

11. The call processing component according to claim 10, further comprising:
means for receiving a second call de-queued notification from the other call processing component in the telecommunication system indicating the identified call has been de-queued and processed in the other call processing component; and means, responsive to the second call de-queued notification, for removing the placeholder queue entry for the identified call from the first call processing component's call processing queue.

12. The call processing component according to claim 9, wherein the requested call has an assigned priority, and after the requested call is queued, a second call request is received for a second requested call having a higher assigned priority than the first requested call;
   wherein the call processing queue includes means for queuing the second requested call ahead of the first requested call; and
   wherein the component includes means for sending a notification to the other call processing components in the telecommunication system indicating that the second requested call has been queued and indicating the priority of the second requested call, thereby enabling each of the other call processing components in the telecommunication system to create a placeholder queue entry for the second requested call ahead of the entry for the first requested call in each call processing component's call processing queue.

13. The call processing component according to claim 12, further comprising:
   means for determining that the call processing queue is full when the second call request is received;
   means for removing from the call processing queue, an entry for an oldest, lowest priority call in the queue; and
   means for sending a notification to the other call processing components in the telecommunication system indicating that the oldest, lowest priority call in the queue has been removed, thereby enabling each of the other call processing components in the telecommunication system to remove the corresponding queue entry for the oldest, lowest priority call in the queue.

14. The call processing component according to claim 9, further comprising:
   a timeout timer for measuring a defined time period upon queuing the requested call in the call processing queue;
   means for de-queuing the requested call when the timer expires; and
   means for sending a notification to the other call processing components in the telecommunication system indicating that the requested call has been removed from the queue, thereby enabling each of the other call processing components in the telecommunication system to remove the corresponding queue entry for the requested call.

15. The call processing component according to claim 9, further comprising:
   means for determining that the requested call has been abandoned by the call's originating party after queuing the requested call in the call processing queue;
   means for de-queuing the requested call in response to determining that the requested call has been abandoned; and
   means for sending a notification to the other call processing components in the telecommunication system indicating that the requested call has been removed from the queue, thereby enabling each of the other call processing components in the telecommunication system to remove the corresponding queue entry for the requested call.

16. The call processing component according to claim 9, wherein the requested call is a Wireless Priority Services (WPS) call, and the component further comprises:
   means for updating an n counter and a SuperCount to keep track of whether the next call to be processed should be a public call or the WPS call; and
   means for sending the updated n counter and SuperCount to the other call processing components in the telecommunication system.

17. The call processing component according to claim 9, wherein the call processing component is one of a plurality of call processing instances within a call processing node.

18. The call processing component according to claim 9, wherein the call processing component is one of a plurality of call processing nodes within a call processing system.

19. The call processing component according to claim 9, wherein the call processing component is one of a plurality of interfaced call processing systems.

20. A call processing system for controlling an order of call processing among a plurality of call processing components, the call processing system comprising:
   a first call processing component; and
   a plurality of other call processing components;
   wherein the first call processing component includes:
      means for receiving a call request;
      means for determining that system resources are not currently available to process the requested call;
      a call processing queue for storing a real queue entry for the requested call;
      means for sending a call-queued notification to the plurality of other call processing components in the telecommunication system;
      means for subsequently de-queuing and processing the requested call when system resources become available and the requested call is the next call in the first call processing component's call processing queue to be processed; and
      means for sending a call de-queued notification to the other call processing components in the telecommunication system indicating that the requested call has been de-queued and processed; and
   wherein each of the plurality of other call processing components includes:
      a call processing queue that is synchronized with the call processing queues of all other call processing components in the telecommunication system;
      means for receiving the call-queued notification and the call de-queued notification from the first call processing component;
      means, responsive to receiving the call-queued notification, for creating a placeholder queue entry for the requested call in each call processing component's call processing queue, wherein the placeholder queue entry serves as a placeholder for the requested call but does not cause the other call processing component to process the requested call, wherein the placeholder queue entry is placed in each component's call processing queue at a position that is synchronized with the queued requested call in the first call processing component's call processing queue, and the placeholder queue entry prevents any of the other call processing components from queuing another call at the same time the requested call is queued; and
      means, responsive to receiving the call de-queued notification, for removing the placeholder queue entry for the requested call from the other call processing component's call processing queue.

21. The call processing system according to claim 20, wherein the first call processing component also includes:
   means for receiving a second call-queued notification from one of the other call processing components in the telecommunication system indicating an identified call has been queued in the other call processing component; and means, responsive to the second call-queued notification, for creating a placeholder queue entry for the identified call in the first call processing component's call processing queue.

22. A computer-controlled method in a telecommunication system for controlling an order of call processing among a plurality of call processing components, the method comprising the steps of:

receiving a call request at a first call processing component;

determining by the first call processing component that system resources are not currently available to process the requested call;

creating by the first call processing component, a real queue entry for the requested call in the first call processing component's call processing queue;

sending from the first call processing component to all other call processing components in the telecommunication system, a call-queued notification indicating that the requested call has been queued while awaiting system resources to process the call, wherein each call processing component includes a call processing queue that is synchronized with the call processing queues of all other call processing components in the telecommunication system;

in response to receiving the call-queued notification, creating by each of the other call processing components in the telecommunication system, a shadow queue entry for the requested call in each of the call processing component's call processing queue, wherein the shadow queue entry serves as a placeholder for the requested call but does not cause any of the other call processing components to process the requested call, wherein the shadow queue entry is placed in each component's call processing queue at a position that is synchronized with the queued requested call in the first call processing component's call processing queue, and the shadow queue entry prevents any of the other call processing components from queuing another call at the same time the requested call is queued;

subsequently determining by the first call processing component that system resources have become available to process the requested call and that the requested call is the next call in the first call processing component's call processing queue to be processed;

de-queuing and processing the requested call by the first call processing component;

sending from the first call processing component to all other call processing components in the telecommunication system, a call de-queued notification indicating that the requested call has been de-queued and processed;

in response to receiving the call de-queued notification, removing by each of the other call processing components in the telecommunication system, the shadow queue entry for the requested call from each call processing component's call processing queue.

23. The method according to claim 22, further comprising the steps of:

receiving by the first call processing component, a second call-queued notification from one of the other call processing components in the telecommunication system indicating an identified call has been queued in the other call processing component; and in response to receiving the second call-queued notification, creating a placeholder queue entry for the identified call in the first call processing component's call processing queue.

24. The method according to claim 23, further comprising the steps of:

receiving by the first call processing component, a second call de-queued notification from the other call processing component in the telecommunication system indicating the identified call has been de-queued and processed in the other call processing component; and in response to receiving the second call de-queued notification, removing the placeholder queue entry for the identified call from the first call processing component's call processing queue.

* * * * *

UNITED STATES PATENT AND TRADEMARK OFFICE
CERTIFICATE OF CORRECTION

PATENT NO. : 8,843,163 B2  
APPLICATION NO. : 12/951240  
DATED : September 23, 2014  
INVENTOR(S) : Mertz et al.

Page 1 of 1

It is certified that error appears in the above-identified patent and that said Letters Patent is hereby corrected as shown below:

Specification

In Column 7, Line 47, delete "FIG. 10." and insert -- FIG. 1C. --, therefor.

In Column 7, Line 48, delete "FIG. 10," and insert -- FIG. 1C, --, therefor.

Signed and Sealed this
Sixteenth Day of August, 2016

Michelle K. Lee
*Director of the United States Patent and Trademark Office*